May 12, 1936. G. W. SWIFT, JR 2,040,799
METHOD AND APPARATUS FOR MAKING SANITARY NAPKINS
Filed Jan. 13, 1934 11 Sheets-Sheet 3
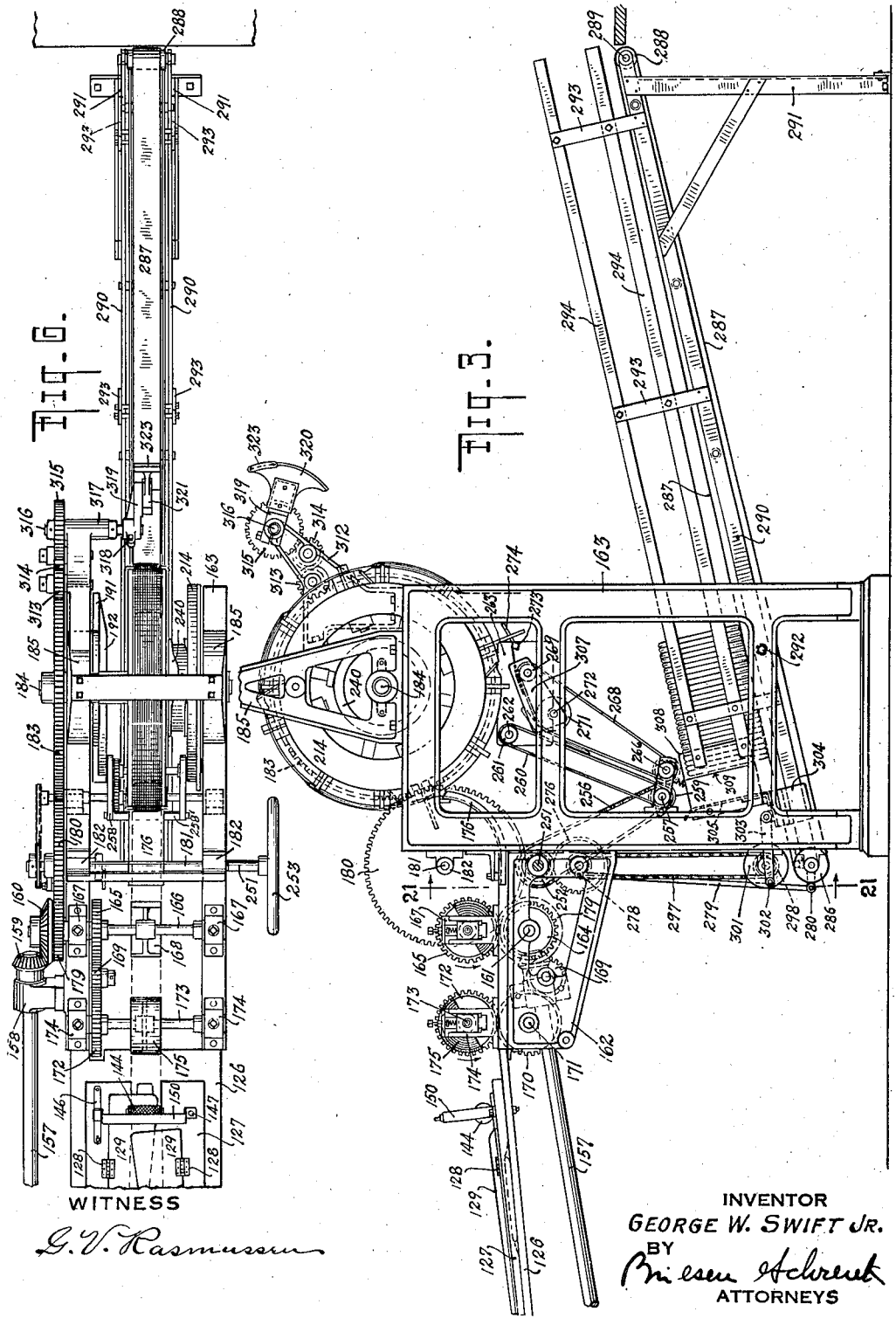
INVENTOR
GEORGE W. SWIFT JR.
ATTORNEYS

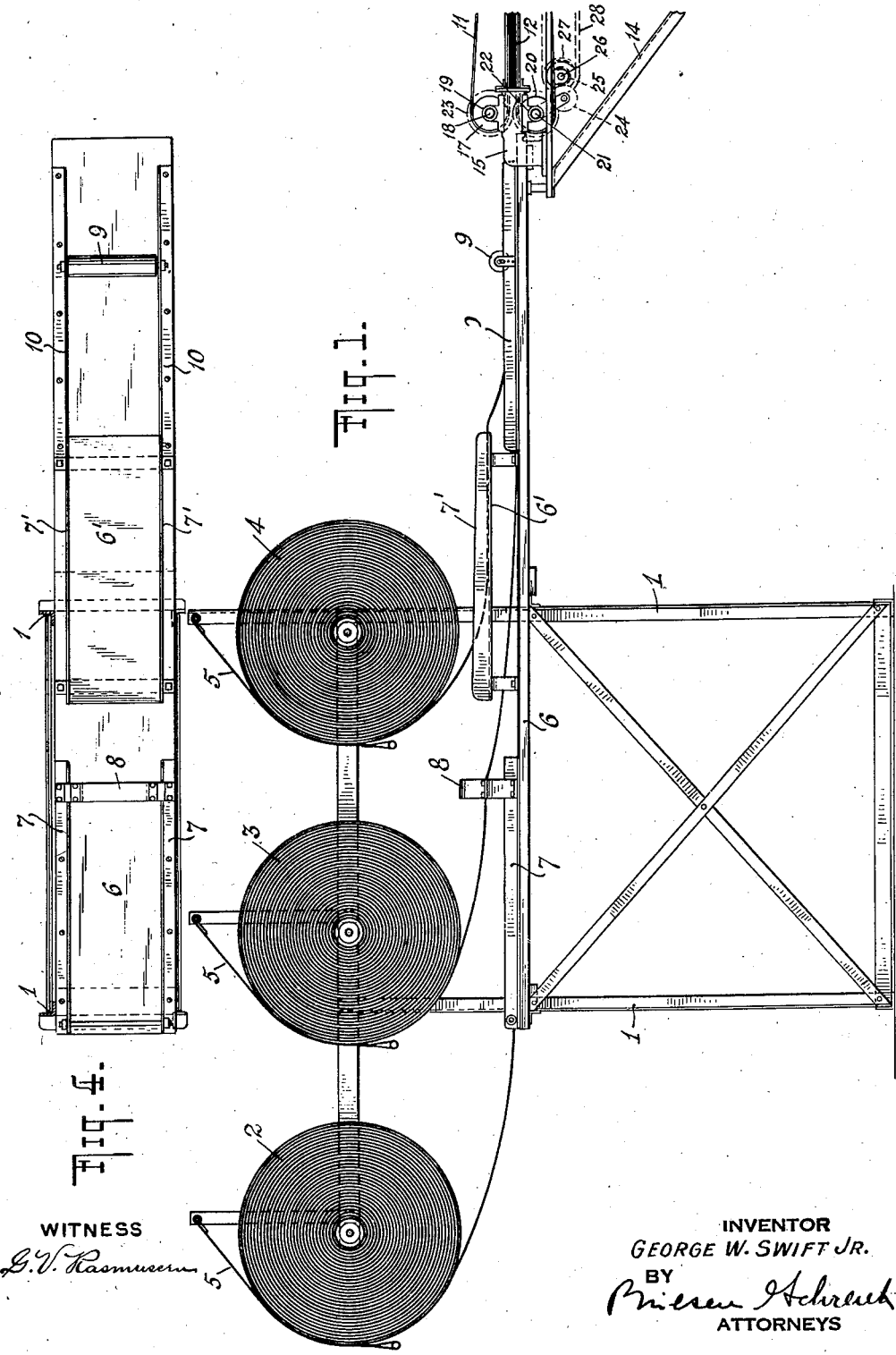

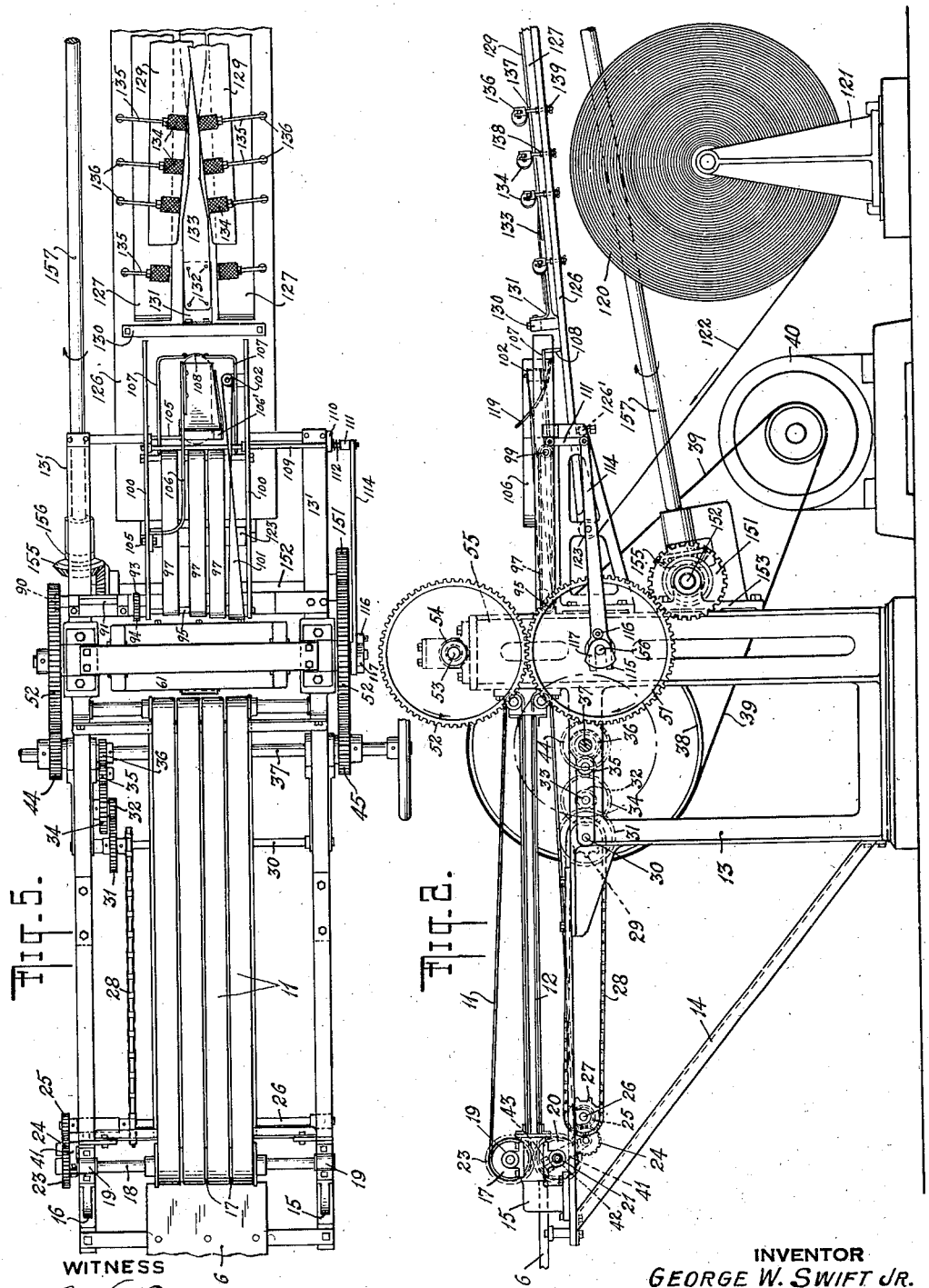

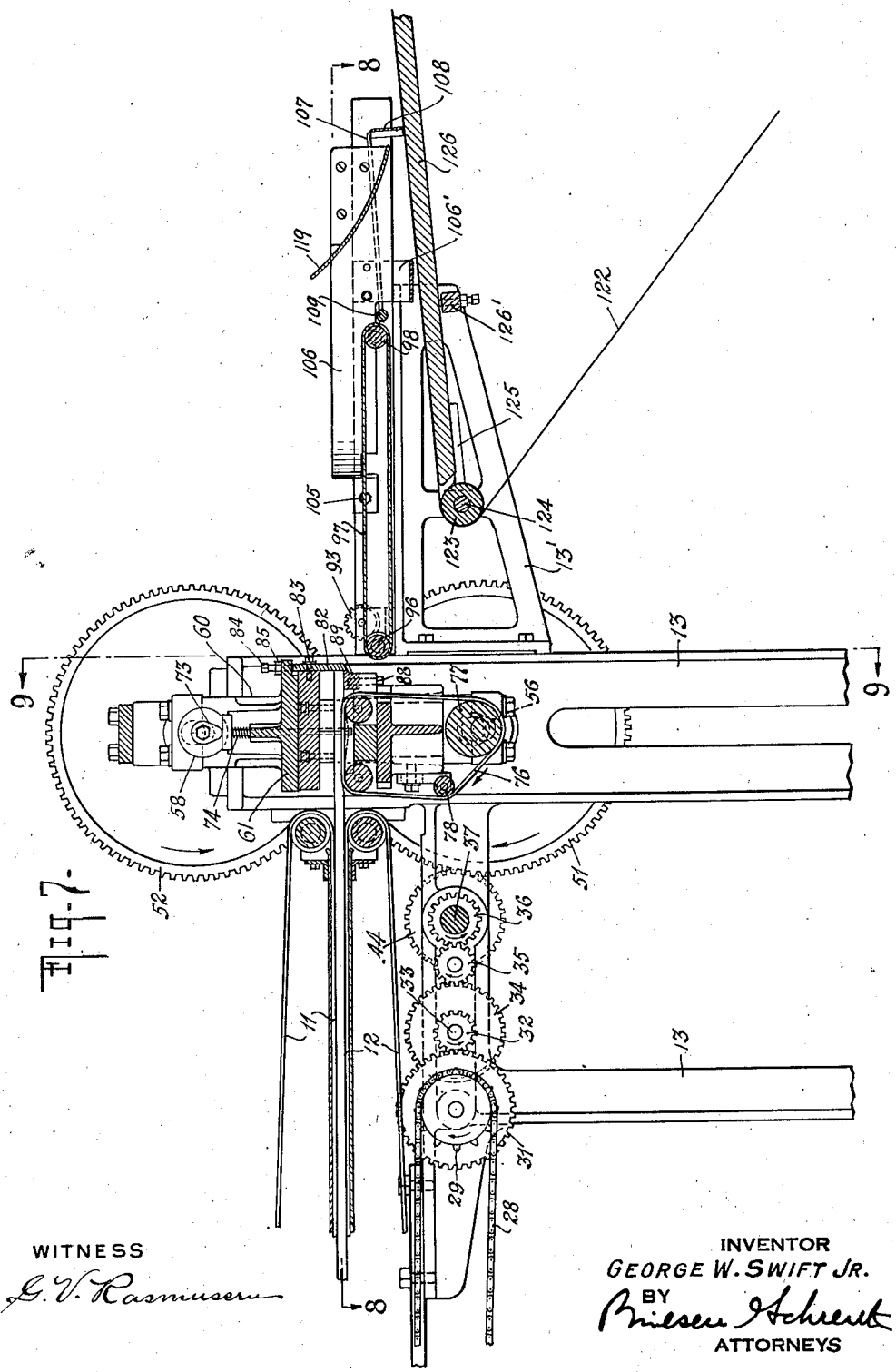

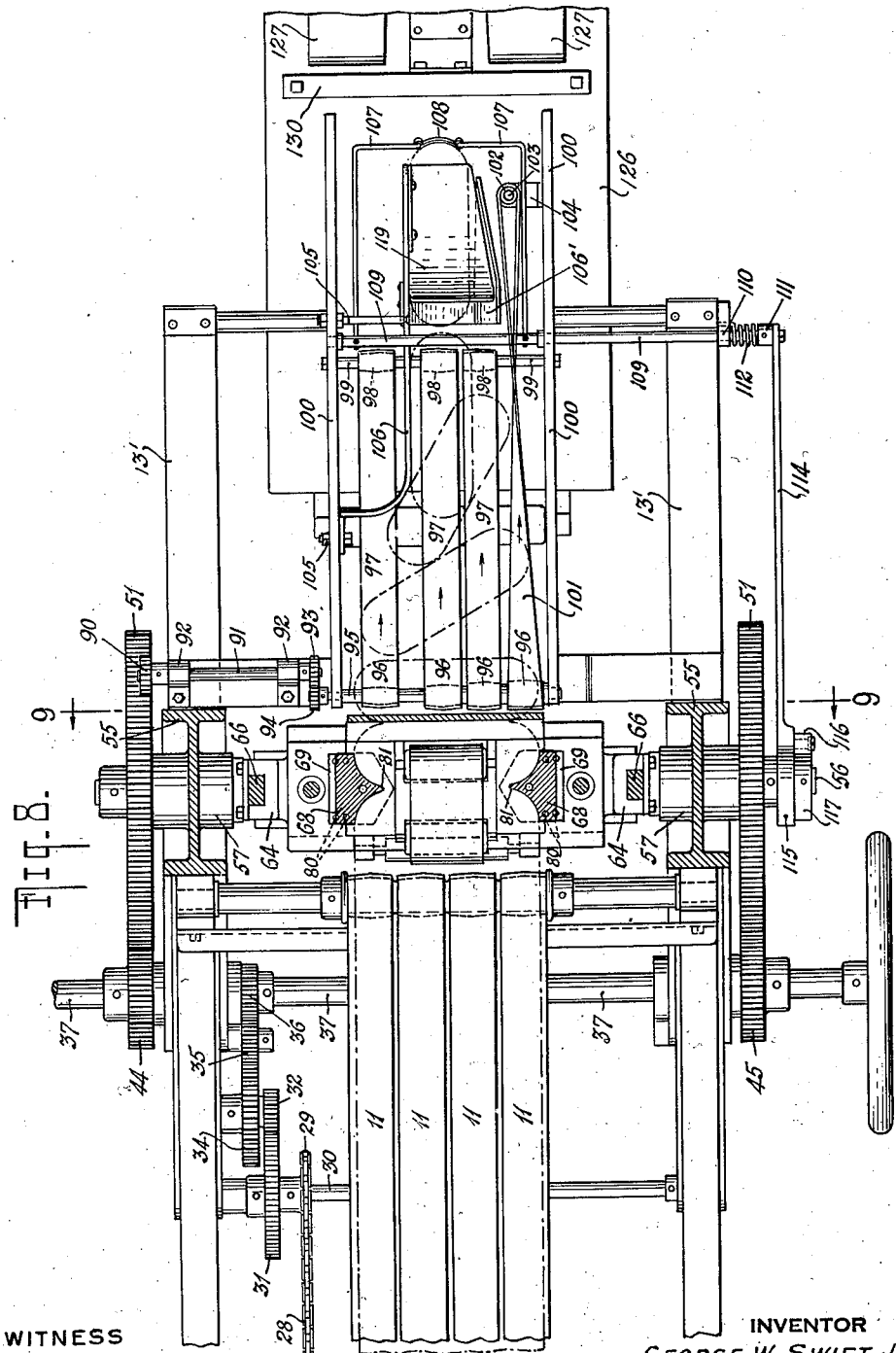

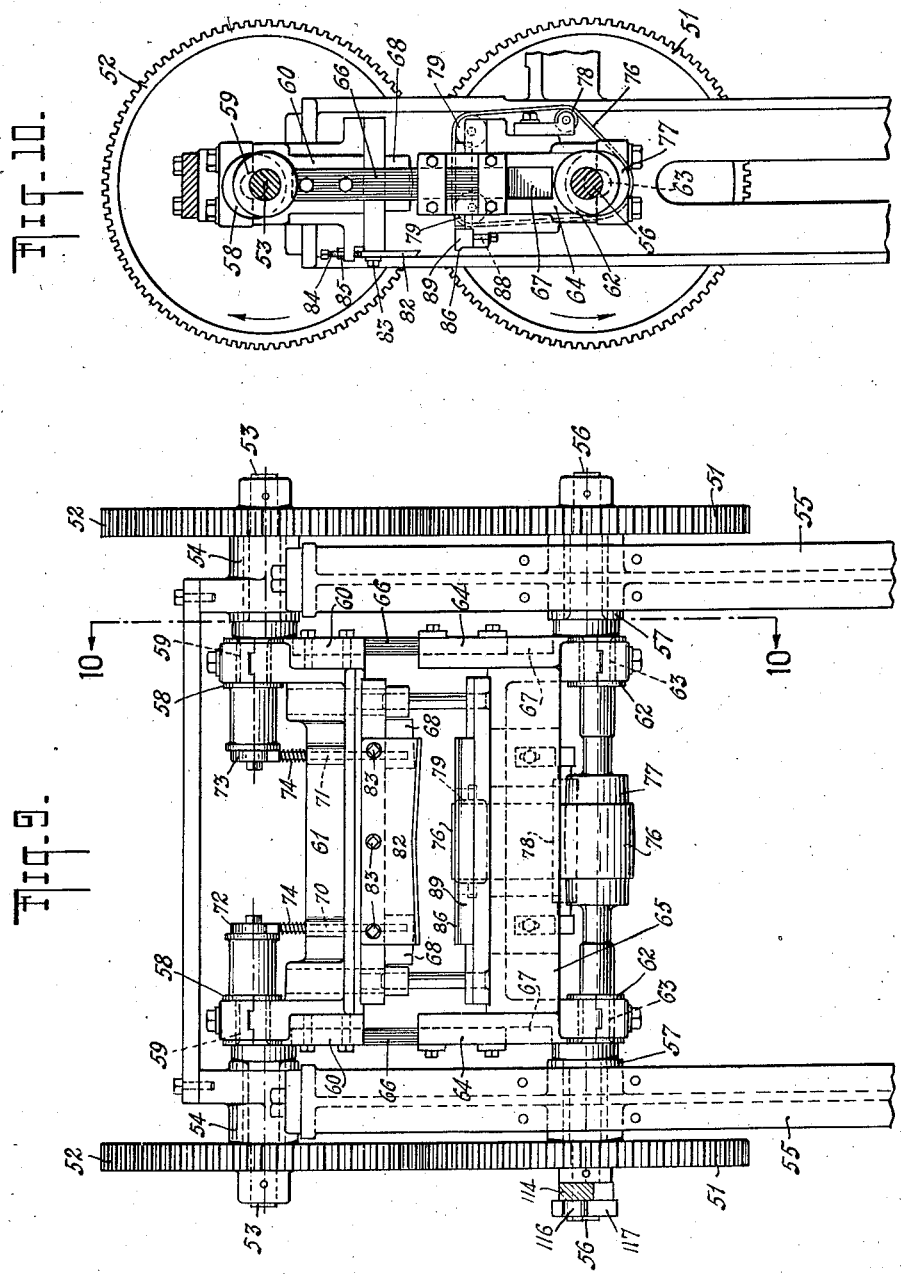

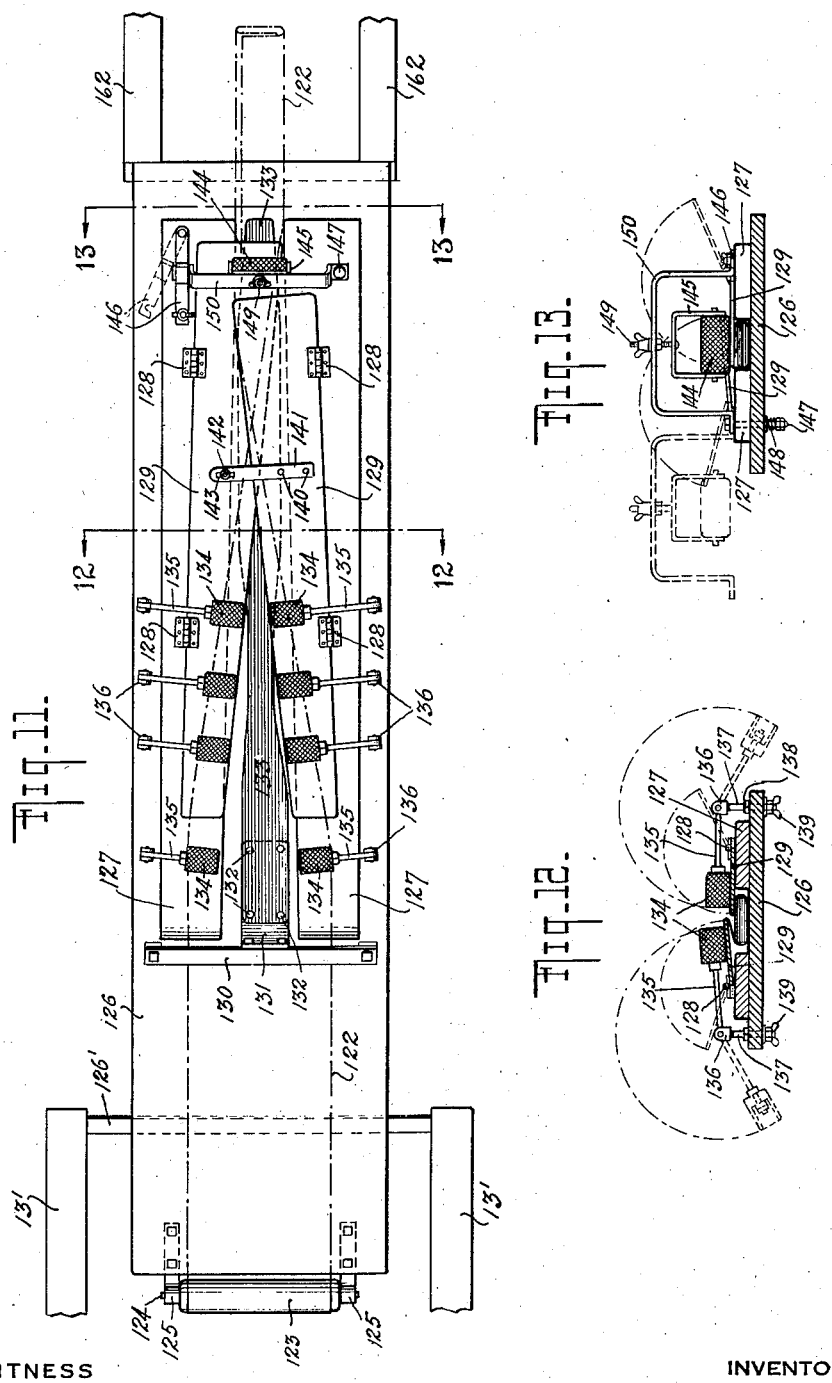

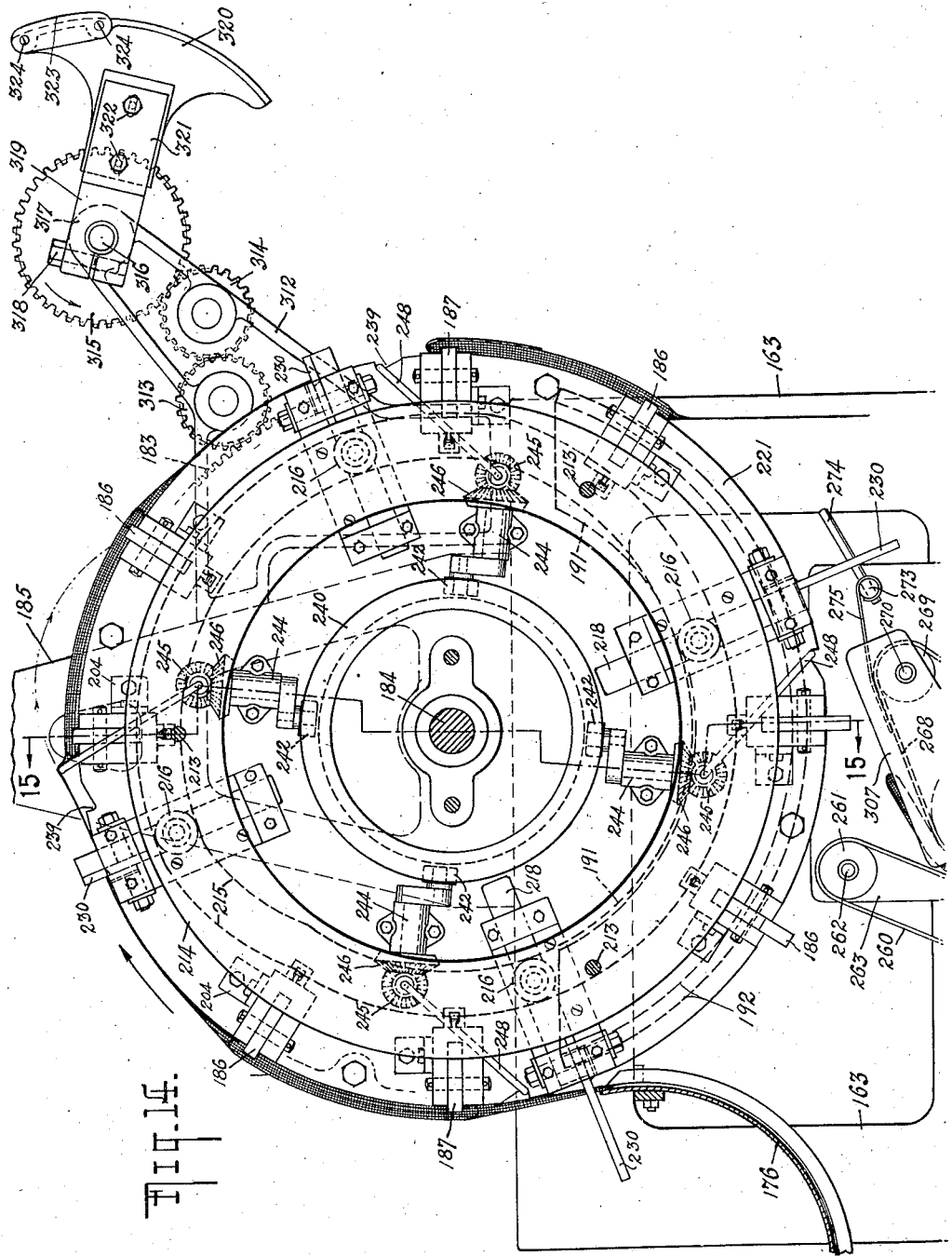

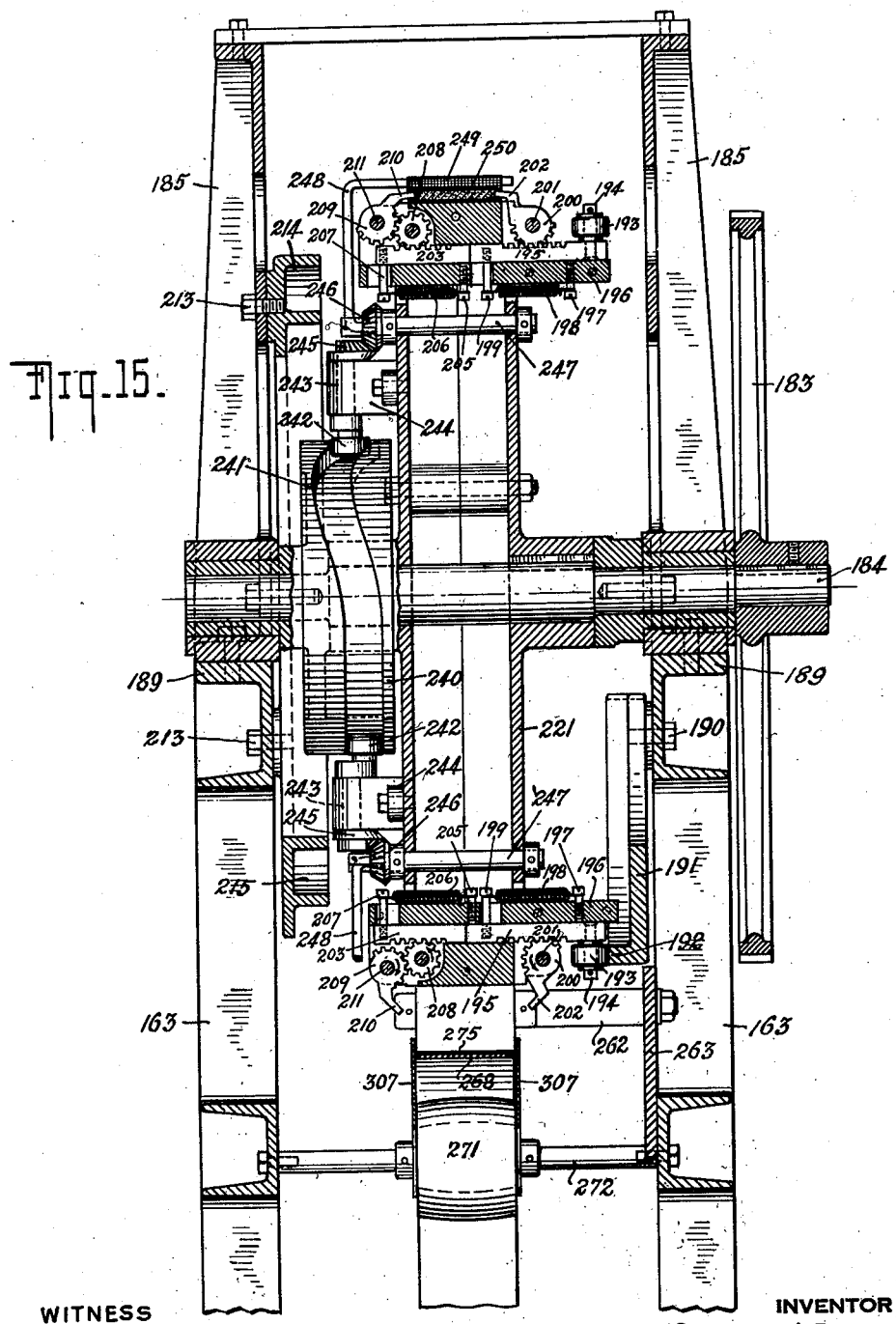

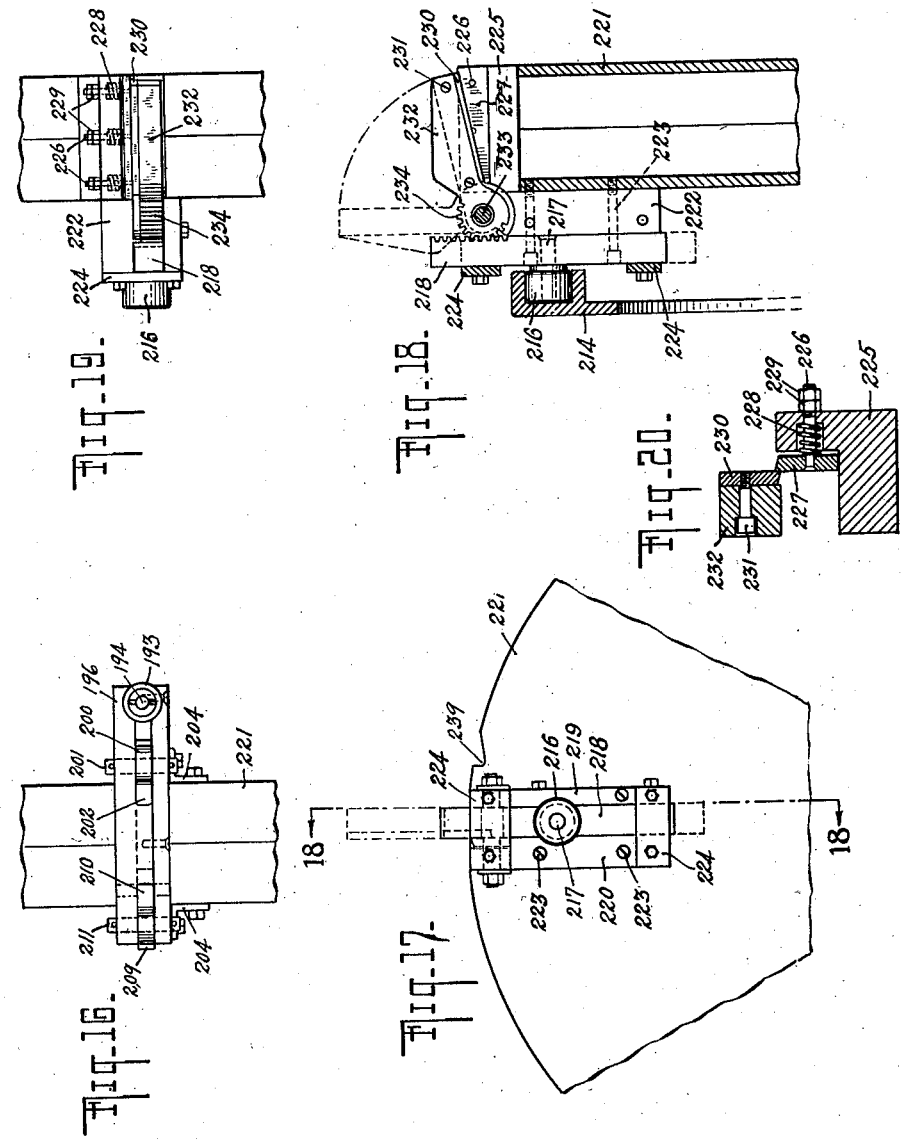

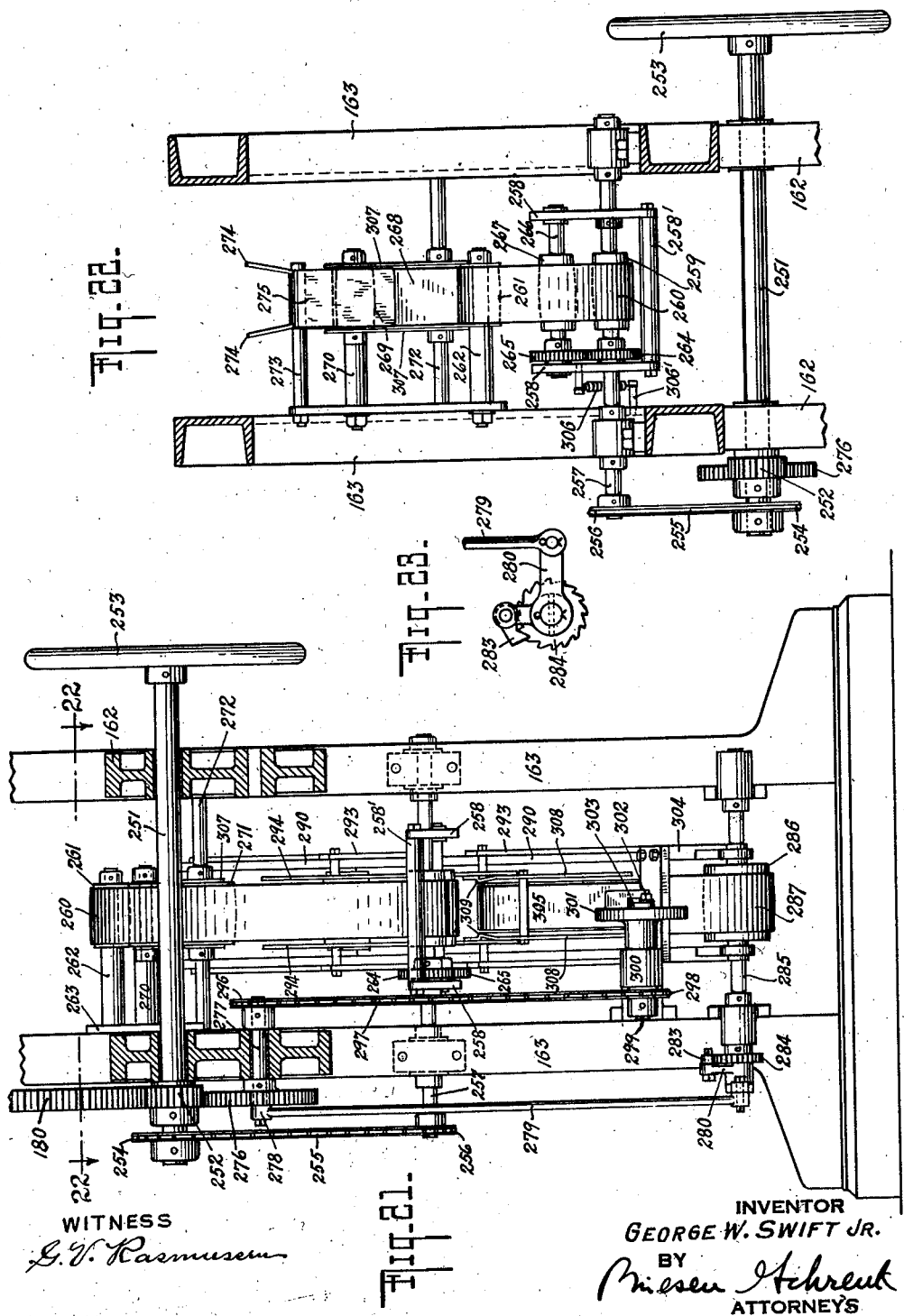

Patented May 12, 1936

2,040,799

UNITED STATES PATENT OFFICE 2,040,799

METHOD AND APPARATUS FOR MAKING SANITARY NAPKINS

George W. Swift, Jr., Bordentown, N. J., assignor to George W. Swift, Jr., Inc., Bordentown, N. J., a corporation of New Jersey Application January 13, 1934, Serial No 706,493

42 Claims. (Cl. 154—29)

The invention relates to an apparatus for making sanitary napkins and to the method of making such napkins.

The sanitary napkin, for the manufacture of which my novel method and apparatus are applicable, comprises a pad of soft filling material, such as absorbent wadding, and a wrapper of gauze or similar suitable material, in which such pad is enclosed.

The filler pad is comprised of two layers of absorbent wadding of equal length, having an intermediate layer of the same material but of shorter length than the outer layers, such intermediate layer being disposed between the outer layers so as to leave substantially equal spaces between the ends of the middle layer and the ends of the outer layers. The two ends of the filler pad will be thus reduced in thickness, the napkin being rendered form-fitting with respect to the body of the wearer, as the usual lumps at the end portions of the napkin are eliminated. The chafing which would attend the use, in a napkin, of a filler pad of equal thickness substantially throughout its length, is likewise obviated by such improved construction.

In the assembling of such a three-ply filler pad, the web of wadding from which the intermediate layer is to be formed, is fed between two outer layers of wadding in such a manner that the intermediate web is positioned precisely centrally of the outer webs, leaving clearances at the two sides of the intermediate web equivalent in width to the amount by which the end of each of the outer plies extends beyond the end of the inner ply of the pad, when the aggregate web of wadding has been cut up into pads by the severance of such wadding transversely of its longitudinal movement through the machine, as will be more apparent from the description hereinafter given.

While I make no claim of novelty with respect to such improved construction of filler pad, I have described the same in detail as my novel method and apparatus are designed for the manufacture of a style of sanitary napkin embodying such improved filler pad, although it will be obvious to those skilled in the art that such method and apparatus are equally applicable to the manufacture of a napkin having a filler pad of a single ply of wadding instead of the three-ply pad just described.

One of the objects of the invention is to provide a machine for manufacturing sanitary napkins continuously and automatically from the moment at which the wadding of filling material to comprise the pad is fed into the machine, until the finished sanitary napkin, with its wrapping of gauze material, is delivered at the end of the machine in stacked relation for packaging into cartons for shipment.

A more particular object of the invention is to provide die cutting mechanism for punching out and severing successive portions from a continuously moving web of filling material, such die cutting mechanism being arranged to travel with the web, and at the same surface speed as such web, during the punching and severing operations and to have such mechanism reciprocate in alignment in opposite directions normal to the plane of travel of the moving web.

A further object of the invention is to provide mechanism whereby the pad delivered from the punch and die elements is turned from its position, in which it is delivered after severance from the web, and is disposed transversely of the direction of its motion, to a position in which it is disposed lengthwise in the same direction, the turning of the pad being accomplished while the same is kept in continuous running motion.

A further object of the invention is to provide mechanism whereby the pad is delivered onto the gauze material into which it is subsequently wrapped, such gauze material becoming the carrier for the pad during the remainder of the progress of such pad through the apparatus.

A further object of the invention is to provide means for feeding the wrapping material, upon which the pad has become deposited, in such manner as to eliminate the possibility of crushing or injuring the pad during such feeding.

A further object of the invention is to provide mechanism for folding the gauze over the pad and for severing the wrapping material from its continuously fed web, permitting such folding and severing to be accomplished without excessive speed during the travel of the guaze with a cylindrical drum upon which the folders and knife elements are mounted circumferentially, so as to travel with the gauze and pad and with such drum.

A still further object of the invention is to provide a plurality of elements of novel construction for gripping the edges of the pad and of the gauze in which such pad has been wrapped, whereby a continuous, smooth, and uniform feeding of the pad and wrapping material is obtained in the course of its travel with the gauze folding and severing cylinder and before it is delivered therefrom as a completed sanitary napkin.

Among other objects of the invention are: to provide the apparatus with mechanism for severing successive portions of webs of different widths without substantial change in the design or operation of the machine; to provide mechanism whereby the necessity of cutting successive portions from the web of wadding to exact width by the severing elements is eliminated; to provide a foundation, such as a belt, beneath, and in the zone of impressment of, the continuously fed web passing through the punch and die mechanism so as to prevent tearing or buckling of the soft and flimsy material constituting such web; to provide a pair of registering stops in the apparatus for controlling the forward feeding periods in the course of the travel of the pad and wrapping materials through the apparatus; to provide folding elements for the trailing end flaps of the wrapping material and an element for smoothening the same, mounted on, and cooperating with, the same mechanism which accomplishes the severing of the gauze material from the continuously moving web of such gauze material; to provide the apparatus with a novel delivery mechanism, whereby the sanitary napkins are delivered from the machine in upright position in stacked relation, so that the possibility of the opening of the gauze flaps after the napkin has left the wrapping mechanism is eliminated; and to provide a method of manufacturing sanitary napkins automatically and continuously without contact by the human hand.

An important feature of my novel sanitary napkin making machine is the use of a die and punch mechanism which is adapted to move with the web, from which portions of wadding are to be punched out and portions successively severed from its forward end, coincidentally with the longitudinal movement of the web, the punch and die mechanism, simultaneously with such longitudinal movement, being reciprocated in alignment in opposite directions normal to the plane of travel of said web. A punch and die mechanism, similar in some respects to that used in the present apparatus, is shown and described in my United States Letters Patent No. 846,362, dated March 5, 1907, in which such mechanism is shown as used in a press and comprising a pair of opposed cross-heads, eccentrics arranged to oscillate said cross-heads, and means on said cross-heads for impressing a moving web.

The mechanism described in my patent above referred to is incapable of application of a flimsy material, such as that comprising the wadding used as a filler in sanitary napkins, due to the lack of consistent body of such material, without some provision for the prevention of tearing or buckling of the web. In accordance with the present invention, therefore, I utilize a foundation member such as a belt having a web supporting portion in the zone impressment of the web, upon which the web is adapted to travel in the course of its passage through the punch and die mechanism. The use of such belt, therefore, makes possible the application of my previously patented structure, with certain improvements and changes in construction, to a sanitary napkin making machine.

The pad of filler material, after it is delivered from the punch and die mechanism and after it has been severed from the continuously moving web, travels in the same direction as the direction of movement of the web. In order to provide a dependable machine of compact construction and automatic operation, with a minimum of attention thereto required of the attendant, the web of wrapping material should travel in the same direction as the web of filling material. It is therefore necessary, subsequent to the severing of the filler pads from the web of wadding, to turn the pad, without extraneous mechanical movement, from a position in which it is disposed transversely of its motion when severed, to a position in which it is disposed lengthwise in the same direction, so that it may be deposited upon the moving web of wrapping material in that position in which it is to be enclosed by said wrapping material. A novel feature of my invention, therefore, is the accomplishment of this object, i. e. of turning the pad from its longtiudinal disposition in one direction to its longitudinal disposition in a direction at right angles to its first position, while such pad is kept in continuous running motion. This object is accomplished by the utilization of a plurality of belts upon which the pad is delivered from the punch and die mechanism, the belts being made to travel at various speeds, increasing toward the end of the pad which is to be turned forwardly, the belt nearest the end of the pad which is to be retarded in its forward motion, traveling at the lowest speed in the series of belts. By such mechanism the pad is turned from its side position to its oblong position as it moves forwardly on the belts, the pad being pivoted by a guide member until the same is travelling lengthwise upon the gauze upon which it is deposited.

A further feature of the invention consists in the provision of the punch and die mechanism with a curved cutting apex, thereby eliminating the necessity of precision in the severance of the pads, i. e. cutting of the pads from the web of filler material at exactly the apices of the notches formed in the web by the punch and die mechanism.

My novel apparatus includes also means for the provision of an amount of clearance in the die and punch mechanism so that the same can be used for punching out longer or shorter pads as may be required from the same web of material with only a slight adjustment in such punch and die mechanism.

Further objects and advantages of my novel method and apparatus will be apparent to those skilled in the art from the following description thereof when taken in conjunction with the accompanying drawings, in which Fig. 1 is a side elevation of the portion of the apparatus showing the rolls of filling material from which the wadding is fed into the machine; Fig. 2 is a side elevation of the central portion of the apparatus showing the punch and die mechanism for severing successive portions from the wadding strip and feeding the same onto the web of wrapping material; Fig. 3 is a side elevation of the gauze wrapping mechanism, end folding mechanism, and delivery portion of the apparatus.

Figs. 1, 2, and 3, successively, thus represent side elevations of the complete machine when such figures are placed horizontally adjacent to each other.

Figs. 4, 5, and 6 are plan elevations of the portions of the apparatus shown in Figs. 1, 2, and 3, respectively; Fig. 7 shows the punch and die mechanism, a portion of the mechanism for feeding the wadding thereinto, and the mechanism for delivering the individual pads therefrom onto the wrapping material, in enlarged detail; Fig. 8 is a horizontal section on the line 8—8 of Fig. 7; Fig. 9 is a vertical sectional view on the line 9—9 of Figs. 7 and 8; Fig. 10 is a vertical section on the line 10—10 of Fig. 9; Fig. 11 is a plan view of the mechanism for folding the side portions of the gauze over the pads; Fig. 12 is a section on the line 12—12 of Fig. 11 showing the manner in which the weighted rollers may be pivoted to a position freeing the same from the moving web of gauze; Fig. 13 is a section on the line 13—13 of Fig. 11 showing the manner in which the press roller positioned at the end point of the side folding mechanism may be removed from its operative position; Fig. 14 is an enlarged detail of the gauze severing and end flap folding mechanism; Fig. 15 is a vertical section on the line 15—15 of Fig. 14; Fig. 16 is a detail plan view of the gripper mechanism; Fig. 17 is a fragmentary side view of the knife mechanism; Fig. 18 is a section on the line 18—18 of Fig. 17; Fig. 19 is a detailed plan view of the knife mechanism; Fig. 20 is a detailed sectional view through the cutting elements; Fig. 21 is a vertical section through the delivery mechanism on the line 21—21 of Fig. 3; Fig. 22 is a horizontal section on the line 22—22 of Fig. 21; and Fig. 23 is a detail view of the pawl and rack wheel for the intermittent advancement of the delivery belt.

Referring more particularly to the drawings, in which similar reference characters identify similar parts in the several views, 1 is a frame structure upon the upper portion of which are mounted successively from the outermost end of the apparatus, a roll of wadding 2 comprising the web of filling material to constitute the lower layer of the filler pad, a roll of wadding 3 of similar material but of somewhat narrower width than the wadding of roll 2 and constituting the intermediate layer of the filler pad, and a roll of wadding 4 of the same width as the material comprising roll 2 and constituting the upper layer of the filler pad. Depending strips 5 of leather or similar material retain the convolutions of the rolls 2, 3, and 4 in position upon such rolls as the material is unwound from the rolls and fed into the machine.

*Filler-web feeding mechanism*

Upon the supporting structure 1 is mounted the table 6, having guide plates 7, 7, upon which the filler material is fed as it is unwound from the rolls. A supporting bracket 8 is preferably provided in advance of the intermediate roll 3, so as to have the intermediate strip of wadding fed from such roll properly positioned centrally of the upper and lower strips fed from the other two rolls. A raised supporting table 6' having guide plates 7' is provided in advance of the roll 4.

As the three strips of wadding from the rolls 2, 3, and 4 are fed upon the table 6, they are passed under a roller 9 and between the guide strips 10, the aggregate web being fed from the table 6, between groups 11 and 12 of endless belts, the latter being effective to draw the aggregate web of filler material from the rolls 2, 3, and 4.

The central portion of the machine is mounted upon a frame 13 from which extends an angle support 14 near the end of which are mounted bearing brackets 15 and 16. The group of belts 11 ride over pulleys 17 mounted upon the shaft 18 supported in bearings 19. The group of belts 12 pass over pulleys 20 mounted on a shaft 21 supported in bearings 22, the end of the shaft 21 carrying a gear 23 meshing with pinion 24 which in turn meshes with a gear 25 mounted on shaft 26 to which is secured the sprocket wheel 27 driven by sprocket chain 28. The other end of the sprocket chain 28 passes over a sprocket wheel 29 mounted on shaft 30 and driven by a gear 31 meshing with pinion 32 on shaft 33. Upon the same shaft 33 is mounted gear 34 meshing with intermediate gear 35, which, in turn, meshes with gear 36 mounted on the main shaft 37. The shaft 37 receives its motive power through pulley 38 at the end of the shaft driven by belt 39 of the motor 40.

For changing the speed of feeding of the filler web, provision is made for inserting a gear of larger or smaller diameter, as required, in place of the pinion 24. For this purpose, the pinion 24 is mounted at the end of an arm 41 having a split hub 42 provided with a bolt 43 by means of which such bracket is removably secured to the hub of the bearing 22.

*Punch and die mechanism*

This mechanism is illustrated in assembled relation with respect to the other portions of the apparatus in Figs. 2 and 5, and in enlarged detail in Figs. 7 to 10, inclusive.

Power for operating the punch and die mechanism and the cutter for severing successive portions from the moving web of filler material simultaneously with the impression of such web by the punch and die, is derived from the main drive shaft 37, driven through pulley 38, rotated by belt 39 directly from the motor 40.

Mounted on shaft 37 are gears 44 and 45 meshing with gears 51, arranged to rotate in the direction of the arrow shown in Fig. 7 and to mesh with gears 52 whose shafts 53 are journalled in bearings 54 in the standards 55. The gears 51 are mounted on the shaft 56, journalled in bearings 57 in the standards 55.

The shafts 53 are provided with wrist-plates 58, having eccentric pins 59 engaging the connecting rods 60, the latter having the cross-head 61 formed integrally therewith. The shafts 56, of gears 51, are provided with wrist-plates 62, having eccentric pins 63 engaging the connecting rod 64, to which the cross-head 65 is rigidly secured.

The cross-heads 61 and 65 are maintained in alignment by the guide-bars 66, which are rigidly secured in the connecting-rods 60 and are arranged to reciprocate in the slide-ways 67 in the connecting-rods 64. The cross-heads 61 and 65 are thus arranged to periodically engage the web moving through the mechanism and to travel therewith during such engagement. The travel of said cross-heads 61 and 65 with the web during their engagement is effected, as shown in Figs. 7, 9, and 10, by the eccentrically mounted pins 59 and 63, which travel concentrically around the axes of the respective shafts 53 and 56 in the direction of the arrows indicated in Fig. 10, and therefore carry the connecting-rods 60 and 64 and their respective cross-heads 61 and 65 in the direction of travel of the web when in contact with said web, and in the opposite direction, when separated. As best shown in Figs. 8, 9, and 10, said cross-heads carry means arranged to compress and punch the web and to sever successive portions from the end thereof.

Such punch and die means comprise punching dies 68, 68, depending from the cross-head 61 arranged to cooperate, at the end of the travel of said cross-head downwardly, with the die-plates 69, 69 to punch substantially V-shaped notches in the sides of the moving web. The material thus punched from the web is pushed from the web by means of rods 70 and 71, running through the cross-head 61, such rods being actuated by cams 72 and 73, mounted upon the ends of shafts 53, the springs 74 being effective to return the rods 70 and 71 to their upper positions upon the upward movement of the cross-head 61.

The mechanism for supporting the filler material during its travel through the punch and die mechanism comprises an endless belt 76 (Figs. 7, 9, and 10) of a width less than the distance between the apices of the die elements of the punch and die mechanism, such belt being propelled by its frictional contact with the surface of roller 77 mounted on the eccentric shaft 56. The belt travels in the direction of the arrow shown on Fig. 7 over rollers 78 and rollers 79, 79, the upper surface of the belt 76 supporting the filler material while it is being impressed by the punch and die mechanism. The provision of this endless belt for supporting the filler material during its travel through the punch and die mechanism is, as hereinabove pointed out, an important feature of my invention making possible the use of such punch and die mechanism on the flimsy material constituting the filler web which would otherwise be incapable of impressment by such punch and die mechanism.

As shown in Fig. 8, the punching die 68 and the die plate 69 are provided with means for varying the distance between the two punching elements and the two die elements so as to adapt the same for operating on webs of filler material of varying width. Such means comprise the provision of a plurality of apertures 80 adapted to receive bolts for securing the punch and die elements at various positions upon their supporting structure. As much as a clearance of ¾ of an inch for each of the punch and die elements may be thus provided, thus making the mechanism adaptable for operation upon webs of filler material varying in width as much as 1½ inches.

As will be also noted from Fig. 8, the apices 81 of the substantially V-shaped punch and die elements are made curved, for instance, with a radius of a sixteenth of an inch, eliminating the necessity of maintaining an exactitude in the severance of the pads so as to sever successive portions from the end of the moving web precisely at the apices of the substantially V-shaped notches.

The means for severing successive portions from the end of the moving web of filler material simultaneously with the impressment thereof by the punch and die mechanism just described, comprises a blade 82 (Figs. 7, 9, and 10) mounted upon the forward edge of the cross-head 61 by means of bolts 83, the distance which such blade depends from the cross-head being adjustable by means of a bolt 84 passing through a projection 85 extending from the cross-head 61, the end of such bolt contacting with the upper end of the blade 82.

In severing successive portions from the end of the filler material the blade 82 is adapted to pass the nose 86 of a shearing block 87 mounted upon the cross-head 65 and held by means of bolts 88. Thus, simultaneously with the impressment of the moving web by the punch and die mechanism, the blade 82 descends with the cross-head 61 shearing off successive portions from the moving web, such portions constituting the filler pads of the sanitary napkin.

*Pad turning mechanism*

This mechanism is illustrated in Figs. 2 and 5 and in enlarged detail in Fig. 8. The gear 90, meshing with one of the gears 51, rotates shaft 91 supported in bearings 92, 92. At the other end of such shaft is mounted gear 93 meshing with gear 94 rotating the shaft 95, to which is secured a plurality of rollers 96 increasing in diameter toward the end of the shaft 95 opposite that from its driven end. Over the rollers 96, and driven frictionally thereby, travel a plurality of endless belts 97 passing over idler rollers 98 mounted upon shaft 99 secured within the guide bars 100, 100 extending longitudinally of the pad turning mechanism and having secured at the ends thereof contiguous to the punch and die mechanism the ends of the shaft 95. In the illustrated embodiment of the structure, the last, 101, of the series of belts 97, is crossed, the belt travelling over the last of the rollers 96 on shaft 95 and over a pulley 102, the axis of which is disposed in a direction at right angles to the axis of the pulleys 96, mounted upon a shaft 103 secured upon bearing bracket 104 extending from one of the guide bars 100.

Secured by bolts 105 to the other guide bar 100 and approximately intermediate the ends of the endless belts 97 is a guide plate 106 of such configuration that the bent portion thereof serves to retard the trailing portion of the pad being forwardly fed upon the endless belts 97, thereby causing the forward end of such pad to turn towards the central belt and to assume a position, by the time it reaches the forward end of the travelling belts, in which it is longitudinally disposed with respect to the direction of its travel upon such belts. This movement of the pads upon the belts will be evident from an inspection of the successive positions of such pads outlined in dotted lines in Fig. 8.

When the pad has been thus turned from its position in which it is disposed transversely of its forward motion to a position in which it is longitudinally disposed in the same direction, it enters the guide chute 106', and has reached the position outlined in Fig. 5, being stopped in its forward motion by the registering stops 107, 107. Such registering stops comprise a pair of rod elements bent in the form of a right angle, the ends of such rods being bent downwardly and connected by a strip of material 108, the configuration of which corresponds to that of the curved forward end of the pad. The registering stops 107 are secured in a shaft 109, one end of which extends over the frame on one side of the apparatus so as to pass through a bearing block 110 mounted upon such frame. To the end of the shaft 109 is secured the hub of a lever 111 between which and the bearing block 110 is disposed a spiral spring 112. At the bottom end of the lever 111 is pivoted a lever 114 having a forked end 115 and carrying near such forked end a roller 116 engaging the surface of a cam 117 mounted on the end of the shaft 56. The rotation of the cam 117 and the spring 112 causes lever 114 to reciprocate and through lever 111 to periodically raise and lower the registering stops 107 with each operation of the punch and die mechanism, thereby causing the forward feeding time to correspond with the severance of the successive portions from the end of the filler web. The forward feeding of the pad to the gauze folding mechanism hereinafter to be described is thus controlled by the cam 117, one pad being fed forwardly into the gauze folding apparatus with each revolution of the punch and die mechanism. An arcuate guide member 119 is provided to assist the pad into the guide chute 106' at the registering stop position of the pad for guiding the pad under the nose of the registering stops 107.

Side folding mechanism

The mechanism for folding the side portions of the wrapping material over the filler pads fed upon the wrapping material is illustrated in enlarged detail in Figs. 11–13.

A roll of wrapping material 120 (Fig. 2) is positioned immediately below the forward end of the side folding mechanism upon suitable supporting structure 121. The wrapping material or gauze 122 passes over a roller 123 mounted on shaft 124 secured, within bearing arms 125, upon the under side of the table 126 extending from the frame 13. The table 126 is supported upon its forward end upon a cross bar 126' secured within the brackets 13' of the frame 13. The other end of the table is supported upon the projecting brackets 162 of the frame 163. The gauze 122 then passes over the upper surface of the table section 126, upon which is mounted the side folding mechanism comprising a pair of plates 127, 127 increasing in width from the feeding end of the folding mechanism to the delivery end, thereby having the space therebetween which constitutes the passage for the gauze, decrease in width toward the delivery end. Secured by hinges 128 to the plate 127 are a pair of tongue plates 129, 129, of increasing width toward the delivery end of the folding mechanism, which may be raised about such hinges so that the gauze material may have one side thereof first folded over upon one of the tongue plates 129 and then have the other side thereof folded over upon the second of said tongue plates 129. Disposed near the feeding end of the side folding mechanism is a bracket 130 extending transversely of the table surface 126 to the central portion of which is secured an angle plate member 131. Attached to the upper surface of the plate member, by a plurality of rivets 132, is a tongue plate 133 of a configuration clearly shown in Fig. 11, and extending substantially the entire length of the table section 126 between the plates 127. Also disposed near the feeding end of the folding mechanism are a plurality of weighted rollers 134 having knurled surfaces which are in contact with the gauze, such rollers being positioned at the ends of rods 135, 135, pivoted in the forked extremities 136 of bolt-like elements 137 passing through table section 126 and secured thereon by lock-nuts 138 and wing-nuts 139. These weighted rollers, as shown in Fig. 12, may be pivoted to a position freeing the same from the moving strip of gauze. Intermediate the ends of the plates 129, and secured by rivets 140 to the upper surface of one of said plates, is a bar 141 through which, near its extremity, passes a bolt 142 adjustable, as to the extent to which such bolt passes through the bar 141, by wing-nut 143. The lower end of the bolt 142 abuts against the surface of the second of the plates 129, providing the necessary adjustable clearance between the plates for the passage, therebetween, of the strip of gauze.

At the end point or delivery end of the side folding mechanism is provided a press roller 144 which may be removed from its operative position by swinging its supporting bracket 145, secured by bolt 149 from the bracket 150, pivotally mounted by bolt 147, having spring 148, upon one of the plates 127 and engaging a lock bracket 146 secured to the other plate 127, to one side so as to give access to the tongue plates 129, 129 for raising the latter when placing the wrapping material into the folding mechanism at the beginning of the folding operation.

Mechanism for feeding the pad containing gauze

The motive power for this mechanism is obtained from the gear 51 (Figs. 2 and 3) which meshes with a gear 151 mounted on shaft 152 secured in a bearing upon the bracket 153 mounted on the frame 13. At the other end of the shaft 152 is provided a bevel gear 154 meshing with bevel gear 155 having a collar 156 within which is secured the end of the shaft 157. The other end of the shaft 157 is secured in bearing 158 (Figs. 3 and 6) and carries bevel gear 159 meshing with bevel gear 160 mounted upon the shaft 161 journalled on a projecting bracket 162 of the frame 163. Mounted on shaft 161, driven by bevel gear 160, is a gear 164 meshing with gear 165 mounted on the shaft 166 supported at its two ends in bearing blocks 167, 167. The shaft 166 has secured thereto for rotational movement about such shaft a semicylindrical or segmental element 168. Engaging gear 165 is an idler gear 169 meshing with gear 170 secured on shaft 171, the gear 170 meshing in turn with a gear 172 mounted upon a shaft 173 supported in bearing blocks 174, 174. The shaft 173 has secured thereto intermediate the bearing blocks 174 thereof a segmental element 175 similar in construction to the segmental element 168.

As the gauze material, containing therein the pads of filler material over which the sides of the gauze have been folded, passes underneath the shafts 173 and 166, the segmental elements 175 and 168 are effective to feed the wrapping material forwardly between the pads wrapped within such material. The rotation of the shafts 166 and 173 and therefore of the segmental elements 168 and 175 is such that the segmental portions of such elements are alternately in contact with the gauze to be fed forwardly, i. e. when one of the segmental elements is in contact with the gauze, feeding the same forwardly, the other segmental element is out of contact with such material. A continuous running rotary feeding of the wrapping material and the pads contained therein is thus effected between the sections of such wrapping material containing the pads.

As the wrapping material is fed forwardly by the segmental elements 168 and 175, it enters the brass channel guide member 176, thereafter entering the gauze severing and end folding mechanism hereinafter described.

Pad gripping, gauze severing, and trailing flap folding mechanism

This mechanism is shown in its relation with respect to the remaining portions of the apparatus in Figs. 3 and 6 and in enlarged detail in Figs. 14 to 19 inclusive.

The motive power for this mechanism is obtained from the gear 179 on shaft 166 which meshes with gear 180 secured to the shaft 181 mounted in bearings 182 secured to the sides of the frame 163. The gear 180 engages the large drum gear 183 mounted on shaft 184 supported in bearing blocks upon the upright extension 185 secured upon the main frame 163.

The detailed construction of the gauze severing and end flap folding mechanism or drum is shown in Figs. 14 and 15. Such drum carries four knife units, a corresponding number of end flap folding units, and the mechanism for gripping the pads enclosed in the wrapping material during the travel of such pads with the drum.

Operating in conjunction with the severing and end flap folding drum is a segmental structure mounted upon the frame to one side of such drum for smoothing the trailing portion of the wrapping material against the pad after such trailing portion has been folded against such pad by the folding elements.

In the embodiment illustrated, the drum is provided with four knife or severing units uniformly distributed and extending radially of the drum.

*Pad gripping mechanism*

Before the first severing unit is reached by the pad, such pad is gripped along its sides by means of grippers, two being effective to grip the pad at its forward end, and two being effective to grip such pad near its trailing end. Four sets of such gripping units are provided circumferentially of the drum.

The general disposition of these various gripper mechanisms throughout the circumference of the folding and severing drum is shown in Fig. 14, in which 186 identifies the pair of gripper elements effective upon the forward portion of the wrapped pad and 187 identifies the pair of gripper elements effective upon the trailing portion of such pad.

The construction and operation of these various gripping elements are illustrated in enlarged sectional detail in Fig. 15. To the upper portion 189 of the main frame 163 is secured, by means of bolts 190, an arcuate cam member 191 the lower extending portion 192 of which is adapted to engage a roller 193 secured by bolt 194 to a rack 195. Such rack is supported upon a rack shoe 196 having a bolt 197 extending therethrough to which is anchored one end of a spring 198, the other end of such spring being anchored to a bolt 199 embedded in the rack 195. Engaging the teeth of the rack 195 is the rack wheel 200 mounted on shaft 201, the rack wheel 200 carrying the gripper element 202.

Contiguous with the end of the rack 195, opposite that upon which the roller 193 is mounted, is a second rack 203 mounted on rack shoe 196, the latter having bolt 205 extending therethrough near one end and having secured thereto one end of the spring 206, the other end of such spring being secured to bolt 207 embedded in the rack 203. Meshing with the gears of the rack 203 is an idler gear 208 engaging rack gear 209, carrying gripper element 210 mounted on shaft 211 for gripping the other side of the pad.

The operation of this rack and gear mechanism is as follows:

When the extension 192 of the arcuate cam member 191 engages the roller 193, it moves the latter towards the vertical central plane of the drum, thereby actuating the racks 195 and 203. The movement of the rack 195 to the left as viewed in Fig. 15 causes rotation of the rack gear 200 in the direction of the arrow at the bottom assembly of the gripping mechanism illustrated in such figure, so as to cause the gripping element 202 to disengage itself from its gripping position on the pad. The rack 203, being pushed to the left by the movement of the rack 195, causes rotation of the idler gear 208 in the direction of the arrow indicated at the bottom portion of Fig. 15, thereby causing the rack wheel 209 to rotate in the opposite direction upon its shaft 211, causing disengagement of the gripper element 210 from the pad. When in the course of the rotation of the drum, the roller 193 is disengaged from its contact with the extension 192 of the arcuate cam member 191, as shown in the upper portion of Fig. 15, springs 198 and 206 are effective to move the racks 195 and 203 in the opposite direction from their original movement, thereby causing rotation of the rack wheels 200 and 209 in a direction causing engagement of the gripper elements carried thereby with the pad so as to grip the same upon its two sides. It is to be understood that the gripper mechanisms just described are duplicated at the forward and trailing portions of the pad.

*Gauze severing mechanism*

The disposition of the several gauze severing units mounted on the cylindrical or drum mechanism is shown in Fig. 14, and enlarged details of such units are shown in Figs. 17 to 20.

Secured to the standard 185 and the frame 165 supporting the drum, by bolts 213, is the cam member 214 having raceway 215 in the face thereof in which are adapted to travel rollers 216, one such roller being provided upon each severing unit. The roller 216 is mounted on shaft 217 embedded in a rack 218 adapted to slide between guide bars 219 and 220 secured to the drum 221, through angle block 222, by bolts 223, 223. The guide bars 219 and 220 are connected by bars 224, 224.

The angle block 222 has its arm 225 extending over the periphery of the drum 221, as clearly shown in Fig. 18, and has secured thereto by bolts 226 the shearing block 227, resting against the upper surface of the body portion of the block 222. Each of the bolts 226 is provided with compression springs 228 exerting pressure against the side of the shearing block 227. Lock nuts 229 are provided on the bolts 228.

The knife element 230 of the severing unit is secured, by bolts 231 passing therethrough, to the arm 232, pivoted on shaft 233, the arm having, at its pivot end, gear face 234 meshing with the teeth of rack 218. The reciprocating movement of the rack 218, as determined by the travel of the roller in the raceway 215 of the cam 214 operates the knife element, the knife descending to the position illustrated in full lines in Fig. 18 so as to sever the gauze between the pads contained therein, upon the upward movement of the rack, and being brought to the position illustrated in dotted lines in such figure, upon the downward movement of the rack. The severing operation is effected upon the gauze during its travel with the drum, the knife remaining in its closed position for more than half of its travel upon the drum during the rotation thereof on the shaft 184. As will be seen from an inspection of Fig. 14, two of the knife elements of the four severing units distributed over the circumference of the drum are in open position, and two in closed position.

*Pad trailing-end folding mechanism*

The mechanism for folding the severed trailing-end flap, which is the shorter of the two end flaps of the napkin, over the pad contained in the wrapping material as it travels with the drum is shown in enlarged detail in Figs. 14 and 15.

Cam 240, mounted on shaft 184, has a spiral cam surface 241 in which is adapted to travel cam roller 242 secured on the end of a shaft 243 mounted in bracket 244 upon the side of the drum. The other end of the shaft 243 carries a segmental bevel gear 245 meshing with bevel gear 246 secured to the end of shaft 247 passing through the drum. Upon the end of the shaft 247 and centrally of the side face of the bevel gear 246 is mounted the folding rod 248, the upper end of which is bent at right angles so as to fold the trailing flap 249 against the upper surface of the wrapped pad 250.

The above described folding mechanism is reproduced at the four portions of the circumference of the drum immediately past the positions of the gauze severing mechanism thereon. As the cam 240 rotates upon the shaft 184, the cam roller 242 is moved sidewise in the cam surface, turning the segmental bevel gear 245 and therefore the bevel gear 246 which in turn operates the end flap folding rod 248.

Upon the return of the folding rod 248 to its inoperative position, it enters a groove 239 provided therefor in the surface of the drum rearwardly of the trailing-end gripping mechanism.

Trailing-end flap smoothing mechanism

The means for smoothing the trailing-end flap of the wrapping material after the same has been folded over the pad enclosed in the gauze is shown in Figs. 3 and 6, and in enlarged detail in Fig. 14. Such structure is supported upon a bracket 312 secured to the frame 163 and the extension 185 thereof.

Meshing with large drum gear 183 of the end folding and severing mechanism, and driven thereby, is a gear 313 driving, through idler gear 314, the gear 315 secured to shaft 316 mounted in hub 317. Secured to the shaft 316 by means of bolt 318 is a split block 319 carrying, at its free end, a segmental smoothing member 320, the position of which upon the block 319 is adjustable by means of plate 321 and bolts 322. The member 320 has a segmental surface of a width equal to the width of the pad and is effective, with each rotation thereof about the shaft 316, to smooth the trailing-end flap of the wrapping material against the upper surface of the wrapped pad, which function is facilitated by a wiping element 323 secured upon the forward portion of the segmental surface by bolts 324.

Delivery mechanism

Mechanism for effecting the delivery of the completed napkin from the apparatus is shown in Figs. 3 and 6, a portion thereof being also illustrated in enlarged detail in Figs. 21, 22, and 23.

The motive power for the moving parts of the delivery mechanism is obtained from shaft 251 rotated by means of gear 252 meshing with the driven gear 180. Upon the free end of the shaft 251 is secured a hand wheel 253 by means of which the moving parts of the mechanism may be advanced manually, for instance, when adjustment of the parts is necessary.

Contiguous to the other end of the shaft 251 and mounted on said shaft is a sprocket gear 254 driving chain 255 which in turn drives sprocket gear 256 secured to a shaft 257, mounted in bearing brackets on the frame 163. Loosely supported upon the shaft 257 are a pair of arms 258 held in spaced relation by means of the connecting rod 258'. Also secured to the shaft 257 is a roller 259, upon which a belt 260 is driven over an idler roller 261 mounted upon a stud shaft 262, said shaft being secured to the supporting plate 263, which plate is secured to the frame 163.

Also secured to the shaft 257 is a gear 264 meshing with gear 265, secured upon shaft 266 having roller 267 mounted thereon. A belt 268 passes over the roller 267 and a roller 269 mounted upon stud shaft 270, also supported from the plate 263. The portion of the belt 268 nearer the belt 260 is made to run parallel thereto for part of its extent by being passed over a roller 271 secured to the shaft 272 extending between the standards of the frame 163. Secured to the plate 263 is a bar 273, over which on each side of the belt 260 extend finger guide members 274 for guiding the napkin upon the guide plate 275 and over such guide plate upon the belt 268. A further means for guiding the napkin between the belts 260 and 268 comprise plates 307, 307.

Meshing with gear 252 is a gear 276 mounted on the shaft 277 on which is eccentrically mounted at 278 a crank rod 279. To the other end of the rod 279 is pivotally secured a bell crank lever 280 mounted loosely on shaft 285, upon which is rigidly secured a ratchet wheel 284. Pivotally mounted on the end of the bell crank lever 280 is a ratchet pawl 283 adapted to advance the ratchet wheel 284 one step with each reciprocating movement of the rod 279. The rotation of the ratchet wheel 284 revolves the shaft 285 and therefore the roller 286, over which travels a belt 287 passing over the roller 288 mounted on shaft 289 between strips 290 supported by standards 291 at one end and from the frame 163 at 292. Extending upwardly from and between the guide strips 290, and on each side of the delivery belt 287, are bars 293, 293, to which are secured the side guide strips 294, 294 retaining the napkins fed onto the belt 287 in upwardly stacked relation.

Secured to the shaft 277 is a sprocket gear 296 driving chain 297 which passes over a lower sprocket gear 298 secured on the shaft 299 within bearing 300 mounted on the side of the frame 163. Secured to the shaft 299 is a disc 301 carrying eccentric pin 302 to which is secured lever 303, from the other end of which depends a sliding block 304 having secured thereto a pusher arm 305 having its upper extremity bent rearwardly, the pusher arm 305 being effective to push a napkin fed between the belts 260 and 268 onto the belt 287 against the stacked napkins upon such belt and between the side guide strips 294. The stacked napkins are held in their upright positions by a pair of plates 308, 308, the ends of which near the stacked napkins being inwardly bent, as at 309, so as to have such bent faces press in the nature of a latch mechanism, against the last of the napkins delivered upon the belt 287.

For tensioning the belt 268, one of the arms 258 is provided with a pin to which is anchored one end of a spring 306, the other end of the spring being anchored to a pin 306' extending from the frame 163.

General operation of the apparatus

The sequence of operations performed by my novel apparatus can best be observed from Figs. 1, 2, and 3.

The filler material, from which the filler pad is to be cut, is fed from rolls 2, 3, and 4 by means of the plurality of belts 11 and 12 into the punch and die mechanism, wherein the substantially V-shaped notches are cut into the sides of the filler material, while the web of filler material is in substantial motion through the punch and die mechanism and while it is supported therein upon the belt 76. Simultaneously with the impressment of the moving web, successive portions from the end thereof are severed, such successively severed portions being deposited upon the series of belts effective to turn the pad from a position in which it is transversely disposed in the direction of its motion to a position in which it is longitudinally disposed in the same direction. The pad is stopped in its forward motion by the stops 107, individual filler pads being permitted to be advanced through the remaining portion of the apparatus by such registering stops with each operation of the punch and die mechanism.

The pad is then deposited upon the gauze constituting the wrapping material and the pad is then fed with such gauze, so that the gauze becomes the feeding means therefor, to the mechanism folding the side portions of the gauze over the filler pads. The gauze and the pads contained therein are then fed by the pair of segmental feeding elements 168 and 175 by means of which a continuous running rotary feeding of the gauze and the pad wrapped therein into the gauze severing and end folding mechanism is obtained. The wrapped filler pad, with the sides of the gauze thereover, is then fed into the gauze severing and end folding unit, wherein the pad is gripped by the gripping mechanism and the gauze severed rearwardly of each pad, the trailing-end flap of the wrapping material folded over upon the upper surface of the pad, smoothed thereon by the segmental smoothing element disposed at the side of the unit, and the pad with the trailing-end flap folded thereover passed from the gauze severing and end folding unit into the delivery mechanism, the forward end flap being folded over the face of the pad as the latter is drawn upon the guide plate 275 and therefore over the bar 273 and between the finger guide members 274. As the forward end of the napkin contacts with the guide plate 275, the forward end flap, hanging limply from the forward end of the napkin, will be folded over the pad as will be clearly evident from Fig. 14, such forward end flap being guided onto the pad between the finger guide members 274. As shown in Fig. 3, the completed napkin is delivered from the apparatus in upright stacked relation ready for packaging and shipping.

I claim:

1. The method of making sanitary napkins which comprises feeding a web of filler material, supporting the web in the zone of, and during its passage through a die cutting mechanism, impressing such web while it is moving, successively severing portions, constituting a pad, from said web while the same is in substantial motion, feeding a strip of wrapping material in the same direction as the direction of feed of the filler material, delivering the pads of filler material severed from said web successively upon the strip of wrapping material, folding the portions of the wrapping material on each side of each pad over said pad, severing successive portions of the wrapping material while the material is moving, and folding the end flaps of the wrapping material over the pad.

2. The method of making sanitary napkins which comprises feeding a web of filler material, impressing such web while it is moving and while supported upon a belt in the zone of its impressment, successively severing portions from said web while the same is in motion, feeding a strip of wrapping material in the same direction as the direction of feed of the filler material, delivering such severed portions of filler material, constituting a pad, successively upon the strip of wrapping material, folding the portions of the wrapping material on each side of a pad over said pad, severing successive portions of the wrapping material at points intermediate the pads while the material is moving, folding the end flaps of the wrapping material over the pad, while such wrapping material and the pad contained therein are moving, and delivering the completed napkin in an upright position in stacked relation.

3. The method of making sanitary napkins which comprises feeding a web of filler material, impressing such web while it is moving and while supported upon a belt in the zone of its impressment, successively severing portions from said web while the same is in motion, feeding a strip of wrapping material in the same direction as the direction of feed of the filler material, delivering such severed portions of filler material, constituting a pad, successively upon the strip of wrapping material, folding the portions of the wrapping material on each side of a pad over said pad, feeding the wrapping material at points intermediate the pads contained therein, severing successive portions of the wrapping material at points intermediate the pads while the material is moving, folding the end flaps of the wrapping material over the pads, while such wrapping material and the pads contained therein are moving, and delivering the completed napkins in upright position in stacked relation.

4. The method of making sanitary napkins which comprises feeding a web of filler material, impressing such web while it is moving and while it is supported upon a belt in the zone of its impressment, successively severing portions from said web while the same is in substantial motion, turning each of said severed portions, constituting a pad, from its position in which it is disposed transversely of the direction of its motion to a position in which it is disposed lengthwise in the same direction, feeding a strip of wrapping material in the same direction as the direction of feed of the filler material, delivering the pads of filler material severed from said web successively upon the strip of wrapping material, folding the portions of the wrapping material on each side of each pad over said pad, severing successive portions of the wrapping material while the material is moving, and folding the end flaps of the wrapping material over the pad.

5. The method of making sanitary napkins which comprises feeding a web of filler material, impressing such web while it is moving and while supported upon a belt, successively severing portions from said web while the same is in motion, turning each of said severed portions, constituting a pad, from its position in which it is disposed transversely of the direction of its motion to a position in which it is disposed lengthwise in the same direction, feeding a strip of wrapping material in the same direction as the direction of feed of the filler material, delivering such severed portions of filler material, constituting a pad, successively upon the strip of wrapping material, folding the portions of the wrapping material on each side of a pad over said pad, severing successive portions of the wrapping material at points intermediate the pads while the material is moving, folding the end flaps of the wrapping material over the pad, while such wrapping material and the pad contained therein are moving, and delivering the completed napkin in an upright position in stacked relation.

6. The method of making sanitary napkins which comprises feeding a web of filler material, impressing such web while it is moving and while supported upon a belt, successively severing portions from said web while the same is in motion, turning each of said severed portions, constituting a pad, from its position in which it is disposed transversely of the direction of its motion to a position in which it is disposed lengthwise in the same direction, feeding a strip of wrapping material in the same direction as the direction of feed of the filler material, delivering such severed portions of filler material successively upon the strip of wrapping material, folding the portions of the wrapping material on each side of a pad over said pad, feeding the wrapping material at points intermediate the pads contained therein, severing successive portions of the wrapping material at points intermediate the pads while the material is moving, folding the end flaps of the wrapping material over the pads, while such wrapping material and the pads contained therein are moving, and delivering the completed napkin in an upright position in stacked relation.

7. The method of making sanitary napkins which comprises feeding a web of filler material, supporting the same during its passage through a die cutting mechanism, impressing such web while it is moving, successively severing portions from said web while it is in motion, turning each of said severed portions, constituting a pad, from its position in which it is disposed transversely of the direction of its motion to a position in which it is disposed lengthwise in the same direction, feeding a strip of wrapping material in the same direction as the direction of feed of the filler material, delivering such severed portions of filler material successively upon the strip of wrapping material, folding the portions of the wrapping material on each side of the filler pad over said pad, feeding the wrapping material at points intermediate the pads contained therein, severing successive portions of the wrapping material at points intermediate said pads while the material is moving, folding the end flaps of the wrapping material over the pads while the wrapping material and pad contained therein are moving, smoothing the folded end flaps over the pad, and delivering the completed napkin in an upright position in stacked relation.

8. In an apparatus for making sanitary napkins, the combination of mechanism for feeding a web of filler material, and a die cutting mechanism for impressing such web, comprising a pair of opposed cross heads, a pair of connecting rods for reciprocating said cross heads in alignment in opposite directions normal to the plane of said web, a pair of eccentrics connected with said cross heads arranged to reciprocate and oscillate the same coincidentally with the longitudinal movement of said web during its impressment, and mechanism comprising a moving belt for supporting the web in the zone of, and during its passage through said die cutting mechanism and during the impressment of such web by said die cutting mechanism.

9. In an apparatus for making sanitary napkins, the combination of mechanism for feeding a web of filler material, a punch and die mechanism for impressing such web, comprising a pair of opposed cross heads, a pair of connecting rods for reciprocating said cross heads in alignment in opposite directions normal to the plane of said web, a pair of eccentrics connected with said cross heads arranged to reciprocate and oscillate the same coincidentally with the longitudinal movement of said web during its impressment and mechanism for supporting the web during its passage through said punch and die mechanism, said supporting mechanism comprising an endless belt surrounding the die mechanism and disposed between portions thereof at which the web is to be impressed.

10. In an apparatus for making sanitary napkins, the combination of mechanism for feeding a web of filler material, a die cutting mechanism for impressing such web, comprising a pair of opposed cross heads, a pair of connecting rods for reciprocating said cross heads in alignment in opposite directions normal to the plane of said web, a pair of eccentrics connected with said cross heads arranged to reciprocate and oscillate the same coincidentally with the longitudinal movement of said web during its impressment, and mechanism for supporting the web in the zone of, and during its passage through said die cutting mechanism, and mechanism for turning each of said severed portions from its position in which it is disposed transversely of the direction of its motion to a position in which it is disposed lengthwise in the same direction.

11. In an apparatus for making sanitary napkins, the combination of mechanism for feeding a web of filler material, a punch and die mechanism for impressing such web, comprising a pair of opposed cross heads, a pair of connecting rods for reciprocating said cross heads in alignment in opposite directions normal to the plane of said web, a pair of eccentrics connected with said cross heads arranged to reciprocate and oscillate the same coincidentally with the longitudinal movement of said web during its impressment, mechanism for supporting the web during its passage through said punch and die mechanism, said supporting mechanism comprising an endless belt surrounding the die mechanism and disposed between portions thereof at which the web is to be impressed, and mechanism for turning each of said severed portions from its position in which it is disposed transversely of the direction of its motion to a position in which it is disposed lengthwise in the same direction.

12. In an apparatus for making sanitary napkins, the combination of mechanism for feeding a web of filler material, punch and die mechanism for impressing such web while the same is moving, a cutter for severing successive portions from said web while the same is moving, and mechanism for turning each of said severed portions, constituting a pad, from its position in which it is disposed transversely of the direction of its motion to a position in which it is disposed lengthwise in the same direction, comprising a pair of shafts, a plurality of rollers mounted on each of said shafts, the rollers on one of said shafts increasing in diameter along said shaft in the direction of the end of the pad which is to be turned forwardly of its motion, and a plurality of belts moving about such rollers.

13. In an apparatus for making sanitary napkins, the combination of mechanism for feeding a web of filler material, punch and die mechanism for impressing such web while the same is moving, a cutter for severing successive portions from said web while the same is moving, and mechanism for turning each of said severed portions, constituting a pad, from its position in which it is disposed transversely of the direction of its motion to a position in which it is disposed lengthwise in the same direction, comprising a plurality of endless belts, upon which the pad is adapted to be moved forwardly in the apparatus, increasing in speed of motion in the direction of the end of the pad which is to be turned forwardly in the course of its movement upon the surfaces of said belts.

14. In an apparatus for making sanitary napkins, the combination of mechanism for feeding a web of filler material, punch and die mechanism for impressing such web while the same is moving, a cutter for severing successive portions from said web while the same is moving, and mechanism for turning each of said severed portions, constituting a pad, from its position in which it is disposed transversely of the direction of its motion to a position in which it is disposed lengthwise in the same direction, such turning mechanism comprising a shaft, a plurality of rollers mounted on said shaft, such rollers increasing in diameter along said shaft in the direction of the end of the pad which is to be turned forwardly of its motion, a second shaft, a plurality of rollers on said second shaft, a plurality of belts moving about corresponding rollers upon said shafts, and a guide plate mounted to one side of the plurality of belts for restraining one end of the pad in its forward motion.

15. In an apparatus for making sanitary napkins, the combination of mechanism for feeding a web of filler material, punch and die mechanism for impressing such web while the same is moving, a cutter for severing successive portions from said web while the same is moving, and mechanism for turning each of said severed portions, constituting a pad, from its position in which it is disposed transversely of the direction of its motion to a position in which it is disposed lengthwise in the same direction, comprising a plurality of endless belts, upon which the pad is adapted to be moved forwardly in the apparatus, increasing in speed of motion in the direction of the end of the pad which is to be turned forwardly in the course of its movement upon the surfaces of said belts, and a guide plate mounted to one side of the plurality of belts for restraining one end of the pad in its forward motion.

16. In an apparatus for making sanitary napkins, a cylindrical member provided at points along its periphery with a plurality of knives for severing successive portions of a material while the same is moving with said cylindrical member in a circumferential path, and a plurality of gripping members disposed at spaced intervals throughout the circumference of the cylinder for gripping the wrapped pads during their travel with the cylinder, and also provided with a plurality of folding elements for folding the end flaps of the wrapping material against the pads during the travel of the material with the member, and a segmental element mounted at a point to one side of the member for smoothing the folded end flaps of the wrapping material against the pads.

17. In an apparatus for making sanitary napkins, the combination of mechanism for feeding a web of filler material, punch and die mechanism for impressing such web of filler material while the same is moving, a support for said web during its impression by said punch and die mechanism, a cutter for severing successive portions from said web while the same is moving, mechanism for turning each of such severed portions from its transverse disposition in the direction of its motion at the time of severance to a position in which it is disposed lengthwise in the same direction, mechanism for feeding a strip of wrapping material in the same direction as the direction of feed of the filler material, mechanism for delivering the severed portion of the material, constituting a pad, upon said wrapping material, mechanism for folding the portions of the wrapping material on each side of the filler pad over the pad, a plurality of segments for feeding the wrapping material forwardly of the machine at points between the pads, a drum provided with a plurality of knives throughout its periphery for severing successive portions of the wrapping material intermediate the pads and also provided with a plurality of folding elements for folding the end flaps of the wrapping material against the pads during the travel of the material with the drum, and mechanism for delivering the completed napkins from the drum in upright position in stacked relation.

18. In an apparatus for making sanitary napkins, the combination of mechanism for feeding a web of filler material, punch and die mechanism for impressing such web of filler material while the same is moving, a support for said web during its impression by said punch and die mechanism, a cutter for severing successive portions from said web while the same is moving, mechanism for turning each of such severed portions from its transverse disposition in the direction of its motion at the time of severance to a position in which it is disposed lengthwise in the same direction, mechanism for feeding a strip of wrapping material in the same direction as the direction of feed of the filler material, mechanism for delivering the severed portion of the material, constituting a pad, upon said wrapping material, mechanism for folding the portions of the wrapping material on each side of the filler pad over the pad, a plurality of segments for feeding the wrapping material forwardly of the machine at points between the pads, a drum provided with a plurality of knives throughout its periphery for severing successive portions of the wrapping material intermediate the pads and also provided with a plurality of folding elements for folding the end flaps of the wrapping material against the pads during the travel of the material through the drum, a segmental element for smoothing the folded end flaps of the wrapper pad, and mechanism for delivering the completed napkins from the drum in upright position in stacked relation.

19. In an apparatus for making sanitary napkins, the combination of mechanism for feeding a web of filler material, punch and die mechanism for impressing such web of filler material, while the same is moving, a support for said web during its impression by said punch and die mechanism, a cutter for severing successive portions from said web, while the same is moving, mechanism for turning each of such severed portions from its transverse disposition in the direction of its motion at the time of severance to a position in which it is disposed lengthwise in the same direction, mechanism for feeding a strip of wrapping material in the same direction as the direction of feed of the filler material, mechanism for delivering the severed portion of the material, constituting a pad, upon said wrapping material, mechanism for folding the portions of the wrapping material on each side of the filler pad over said pad, a plurality of segments for feeding the wrapping material forwardly of the machine at points between the pads, a drum provided with a plurality of knives throughout its periphery for severing successive portions of the wrapping material intermediate the pads and also provided with a plurality of folding elements for folding the end flaps of the wrapping material against the pads during the travel of the material with the drum, a plurality of gripping elements disposed circumferentially of the drum for gripping the wrapped pads during their travel with the drum, and mechanism for delivering the completed napkins from the drum in upright position in stacked relation.

20. In an apparatus for making sanitary napkins, the combination of mechanism for feeding a web of filler material, punch and die mechanism for impressing such web of filler material while the same is moving, a support for said web during its impression by said punch and die mechanism, a cutter for severing successive portions from said web while the same is moving, mechanism for turning each of such severed portions from its transverse disposition in the direction of its motion at the time of severance to a position in which it is disposed lengthwise in the same direction, mechanism for feeding a strip of wrapping material in the same direction as the direction of feed of the filler material, mechanism for delivering the severed portion of the material, constituting a pad, upon said wrapping material, mechanism for folding the portion of the wrapping material on each side of the filler pad over said pad, a plurality of segments for feeding the wrapping material forwardly of the machine at points between the pads, a drum provided with a plurality of knives throughout its periphery for severing successive portions of the wrapping material intermediate the pads and also provided with a plurality of folding elements for folding the end flaps of the wrapping material against the pads during the travel of the material with the drum, a plurality of gripping elements disposed circumferentially of the drum for gripping the wrapped pads during their travel with the drum, a segmental element for smoothing the folded end flaps of the wrapped pad, and mechanism for delivering the completed napkins from the drum in upright position in stacked relation.

21. In an apparatus for making sanitary napkins, punch and die mechanism for impressing a web of filler material to cut portions from said web, thereby providing such web with substantially V-shaped notches at opposite points along its sides, the punch and die elements of said mechanism having substantially semi-circular cutting surfaces at their portions forming the apices of said notches.

22. In an apparatus for making sanitary napkins, mechanism for delivering the completed napkins in upright position in stacked relation comprising a pair of endless belts, the portion of one of said belts nearer the second of said belts running parallel thereto for part of its extent and at an angle thereto for the remainder of its extent, a supporting plate, a guide plate, a pair of finger guide members for guiding the napkin over said guide plate upon one of said belts, an endless belt below the delivery end of said first mentioned pair of belts, and a pusher arm effective to push a napkin fed from between said first mentioned belts onto the delivery belt against the stacked napkins upon such belt.

23. In an apparatus for making sanitary napkins, a cylindrical member provided with a plurality of gripping units disposed at spaced intervals throughout the circumference of the cylinder for gripping the wrapped pads during their travel with the cylinder, each of said gripping units comprising a divided rack, a pair of springs controlling the elements of said rack, and a pair of rack wheels, each carrying a gripper element adapted to be brought into contact with the edge of the pad for gripping the same.

24. In an apparatus for making sanitary napkins, a drum having an arcuate cam member, a divided rack, a roller mounted on said rack and adapted to be engaged by said cam member to move said rack, a pair of springs secured to the divided portions of said rack, and a pair of rack wheels cooperating with said rack and carrying gripper elements adapted to be brought, upon rotation of said wheels, into contact with the edges of the pad for gripping the same.

25. In an apparatus for making sanitary napkins, a drum provided with a plurality of gauze severing units disposed at spaced intervals throughout the periphery of the drum, each of said units comprising a rack, a roller secured thereto, a pivoted arm having a gear face, and a knife mounted upon said arm, adapted to be pivoted with said arm upon movement of said rack.

26. In an apparatus for making sanitary napkins, a frame, a cam member secured to said frame having a raceway in the face thereof, a cylindrical member supported on said frame and having a plurality of rollers adapted to travel in the raceway of said cam member, a plurality of knives provided at points along the periphery of said cylindrical member and pivoted thereon, a plurality of racks adapted for reciprocating movement determined by the travel of the rollers in the raceway of said cam member for effecting the pivoting of said knives at predetermined times during the revolution of said cylindrical member for severing successive portions of a material while the same is moving with said cylindrical member in a circumferential path.

27. In an apparatus for making sanitary napkins, mechanism for delivering the completed napkins in upright position in stacked relation including a pair of endless belts, the portion of one of said belts nearer the second of said belts running parallel thereto for part of its extent and at an angle thereto for the remainder of its extent, an endless belt below the delivery end of said first mentioned pair of belts, and a pusher arm effective to push a napkin from between said first mentioned belts onto the delivery belt against the stacked napkins upon such delivery belt.

28. In an apparatus for making sanitary napkins, a cylindrical member provided at points along its periphery with a plurality of knives for severing successive portions of a material while the same is moving with said cylindrical member in a circumferential path, said cylindrical member being also provided with a plurality of folding elements for folding the end flaps of the wrapping material against the pads during the travel of the material with the cylinder.

29. In an apparatus for making sanitary napkins, a cylindrical member provided at points along its periphery with a plurality of knives for severing successive portions of a material while the same is moving with said cylindrical member in a circumferential path, said cylindrical member being also provided with a plurality of folding elements for folding the end flaps of the wrapping material against the pads during the travel of the material with the cylinder, and a segmental element mounted at a point to one side of the cylindrical member for smoothing the folded end flaps of the wrapping material against the pads.

30. In an apparatus for making sanitary napkins, the combination of mechanism for feeding a web of filler material, oscillatory punch and die mechanism for impressing such web while the same is moving and adapted to travel at the same surface speed as the moving web at the moment of impression of said web by said punch and die mechanism, a moving support for said web in the zone of, and during, its impression by said punch and die mechanism, and a cutter for severing successive portions from said web while the same is in substantial motion.

31. In an apparatus for making sanitary napkins, the combination of mechanism for feeding a web of filler material, oscillatory punch and die mechanism for impressing such web while the same is moving and adapted to travel at the same surface speed as the moving web at the moment of impression of said web by said punch and die mechanism, a moving support for said web in the zone of, and during, its impression by said punch and die mechanism, a cutter for severing successive portions from said web while the same is in substantial motion, and mechanism for turning each of said severed portions from its position in which it is disposed transversely of the direction of its motion to a position in which it is disposed lengthwise in the same direction.

32. In an apparatus for making sanitary napkins, a frame, a cam member secured to said frame and having a raceway in the face thereof, a cylindrical member having a plurality of rollers secured thereto and adapted to travel within said raceway, and provided at points along its periphery with a plurality of knives for severing successive portions of a material while the same is moving with said cylindrical member in a circumferential path, each of said knives being adapted to effect the severing of successive portions of the material upon the movement within the raceway of the cam member and radially of the cylindrical member of said rollers.

33. In an apparatus for making sanitary napkins, the combination of mechanism for feeding a web of filler material, oscillatory punch and die mechanism for impressing such web while the same is moving and adapted to travel at the same surface speed as the moving web at the moment of impression of said web by said punch and die mechanism, including a moving belt having a web supporting portion in the zone of impression of such web by the punch and die mechanism, a cutter for severing successive portions from said web while the same is moving, and mechanism for turning each of said severed portions from its position in which it is disposed transversely of the direction of its motion to a position in which it is disposed lengthwise in the same direction.

34. In an apparatus for making sanitary napkins, the combination of mechanism for feeding a web of filler material, punch and die mechanism for impressing such web while the same is moving and adapted to travel at the same surface speed as the moving web at the moment of impression of said web by said punch and die mechanism, mechanism for supporting the web in the zone of, and during its passage through, said punch and die mechanism, a cutter for severing successive portions from said web while the same is moving, mechanism for feeding a wrapping material in the same direction as the direction of feed of the filler material, mechanism for delivering the severed portions of said material, constituting a pad, upon said wrapping material, mechanism for folding the portions of the wrapping material on each side of the pad over said pad, and a plurality of segments for feeding the wrapping material forwardly of the machine at points between the pads.

35. In the method of making sanitary napkins, the step of punching substantially V-shaped notches in the sides of a moving web of filler material so as to have pairs of such notches in the two sides of the web opposite each other while the web is substantially in motion and while it is supported upon a belt in the zone intermediate the portions in which such notches are punched.

36. In the method of making sanitary napkins, the steps of punching substantially V-shaped notches in the sides of a moving web of filler material so as to have pairs of such notches in the two sides of the web opposite each other while the web is substantially in motion and while it is supported upon a belt in the zone intermediate the portions in which such notches are punched, and then severing successive portions from said moving web by cutting the same along a line joining the apices of said V-shaped notches.

37. In an apparatus for making sanitary napkins, a frame, a cam member secured to said frame and having a raceway in the face thereof, a cylindrical member having a plurality of rollers secured thereto and adapted to travel within said raceway, and provided at points along its periphery with a plurality of knives for severing successive portions of a material while the same is moving with said cylindrical member in a circumferential path, each of said knives being adapted to effect the severing of successive portions of the material upon the movement within the raceway of the cam member and radially of the cylindrical member of said rollers, said cylindrical member being provided with a plurality of folding elements for folding the end flaps of the wrapping material against the pads during the travel of the material with the cylinder.

38. In an apparatus for making sanitary napkins, a frame, a cam member secured to said frame and having a raceway in the face thereof, a cylindrical member having a plurality of rollers secured thereto and adapted to travel within said raceway, and provided at points along its periphery with a plurality of knives for severing successive portions of a material while the same is moving with said cylindrical member in a circumferential path, each of said knives being adapted to effect the severing of successive portions of the material upon the movement within the raceway of the cam member and radially of the cylindrical member of said rollers, said cylindrical member being provided with a plurality of folding elements for folding the end flaps of the wrapping material against the pads during the travel of the material with the cylinder, and a segmental element mounted at a point to one side of the cylindrical member for smoothing the folded end flaps of the wrapping material against the pads.

39. In an apparatus for making sanitary napkins, a frame, a cam member secured to said frame and having a raceway in the face thereof, a cylindrical member having a plurality of rollers secured thereto and adapted to travel within said raceway, and provided at points along its periphery with a plurality of knives for severing successive portions of a material while the same is moving with said cylindrical member in a circumferential path, each of said knives being adapted to effect the severing of successive portions of the material upon the movement within the raceway of the cam member and radially of the cylindrical member of said rollers, said cylindrical member being provided with a plurality of gripping members disposed at spaced intervals throughout the circumference of the cylinder for gripping the wrapped pads during their travel with the cylinder.

40. In an apparatus for making sanitary napkins, a frame, a cam member secured to said frame and having a raceway in the face thereof, a cylindrical member having a plurality of rollers secured thereto and adapted to travel within said raceway, and provided at points along its periphery with a plurality of knives for severing successive portions of a material while the same is moving with said cylindrical member in a circumferential path, each of said knives being adapted to effect the severing of successive portions of the material upon the movement within the raceway of the cam member and radially of the cylindrical member of said rollers, said cylindrical member being provided with a plurality of gripping members disposed at spaced intervals throughout the circumference of the cylinder for gripping the wrapped pads during their travel with the cylinder and a plurality of folding elements for folding the end flaps of the wrapping material against the pads during the travel of the material with the cylinder.

41. In an apparatus for making sanitary napkins, a frame, a cam member secured to said frame and having a raceway in the face thereof, a cylindrical member having a plurality of rollers secured thereto and adapted to travel within said raceway, and provided at points along its periphery with a plurality of knives for severing successive portions of a material while the same is moving with said cylindrical member in a circumferential path, each of said knives being adapted to effect the severing of successive portions of the material upon the movement within the raceway of the cam member and radially of the cylindrical member of said rollers, said cylindrical member being provided with a plurality of gripping members disposed at spaced intervals throughout the circumference of the cylinder for gripping the wrapped pads during their travel with the cylinder, and with a plurality of folding elements for folding the end flaps of the wrapping material against the pads during the travel of the material with the cylinder, and a segmental element mounted at a point to one side of the cylindrical member for smoothing the folded end flaps of the wrapping material against the pads.

42. In an apparatus for making sanitary napkins, the combination of mechanism for feeding a web of filler material, oscillatory punch and die mechanism for impressing such web while the same is moving and adapted to travel at the same surface speed as the moving web at the moment of impression of said web by said punch and die mechanism, a moving support for said web in the zone of, and during, its impression by said punch and die mechanism, and a cutter for severing successive portions from said web while the same is in substantial motion, the apices of the punch and die elements of the die cutting mechanism being curved.

GEORGE W. SWIFT, JR.